(12) United States Patent
Weinegger

(10) Patent No.: US 7,171,098 B2
(45) Date of Patent: Jan. 30, 2007

(54) CABLE MANAGEMENT DEVICE

(75) Inventor: Mark E. Weinegger, Franklin, MA (US)

(73) Assignee: C.E. Communication Services, Inc., Franklin, MA (US)

( * ) Notice: Subject to any disclaimer, the term of this patent is extended or adjusted under 35 U.S.C. 154(b) by 144 days.

(21) Appl. No.: 10/987,254

(22) Filed: Nov. 12, 2004

(65) Prior Publication Data
US 2006/0104589 A1 May 18, 2006

(51) Int. Cl.
*G02B 6/00* (2006.01)
(52) U.S. Cl. .................... 385/134; 385/135; 385/136
(58) Field of Classification Search ......... 385/134–136
See application file for complete search history.

(56) References Cited

U.S. PATENT DOCUMENTS

| | | | |
|---|---|---|---|
| 5,109,467 A | 4/1992 | Hogan et al. | 385/135 |
| 5,323,480 A | 6/1994 | Mullaney et al. | 385/135 |
| 5,546,495 A | 8/1996 | Bruckner et al. | 385/135 |
| 5,790,740 A | 8/1998 | Cloud et al. | 385/135 |
| 5,933,563 A | 8/1999 | Schaffer et al. | 385/135 |
| 6,275,640 B1 | 8/2001 | Hunsinger et al. | 385/135 |
| 6,396,990 B1 | 5/2002 | Ehn et al. | 385/135 |
| 6,543,940 B2 | 4/2003 | Chu | 385/53 |
| 6,533,470 B2 | 5/2003 | Ahrens | 385/88 |
| 6,621,974 B1 | 9/2003 | Chu | 385/135 |
| 6,724,970 B2 * | 4/2004 | Adapathya et al. | 385/135 |
| 2003/0123832 A1 * | 7/2003 | Adapthya et al. | 385/135 |
| 2003/0185536 A1 * | 10/2003 | Steinman et al. | 385/134 |

OTHER PUBLICATIONS

NorfolkWire & Electronic Cable Control Cable Management Tools: CABLECONTROL™ www.connectworld.net/bulkcable/cablecontrol.html.
NorfolkWire & Electronic Cable Control Cable Management Tools: Rack & Wire Managers www.connectworld.net/bulkcable/relay_rack_wire_managers.html.

* cited by examiner

*Primary Examiner*—Frank G. Font
*Assistant Examiner*—Mary El-Shammaa
(74) *Attorney, Agent, or Firm*—Bourque and Associates

(57) ABSTRACT

A cable management system includes a first and a second support adapted to be disposed along at least a portion of a first and a second edge of a rack containing a plurality of pieces of equipment. The first support includes a plurality of openings sized and shaped to accept only cables associated with a specific piece of equipment within the rack. The second support includes a generally solid surface such that cables or the like cannot enter the rack from the second side. A plurality of cable arms are removably connected to the supports and are adapted to support the cables disposed through only a single opening in the first support associated with a specific piece of equipment.

18 Claims, 4 Drawing Sheets

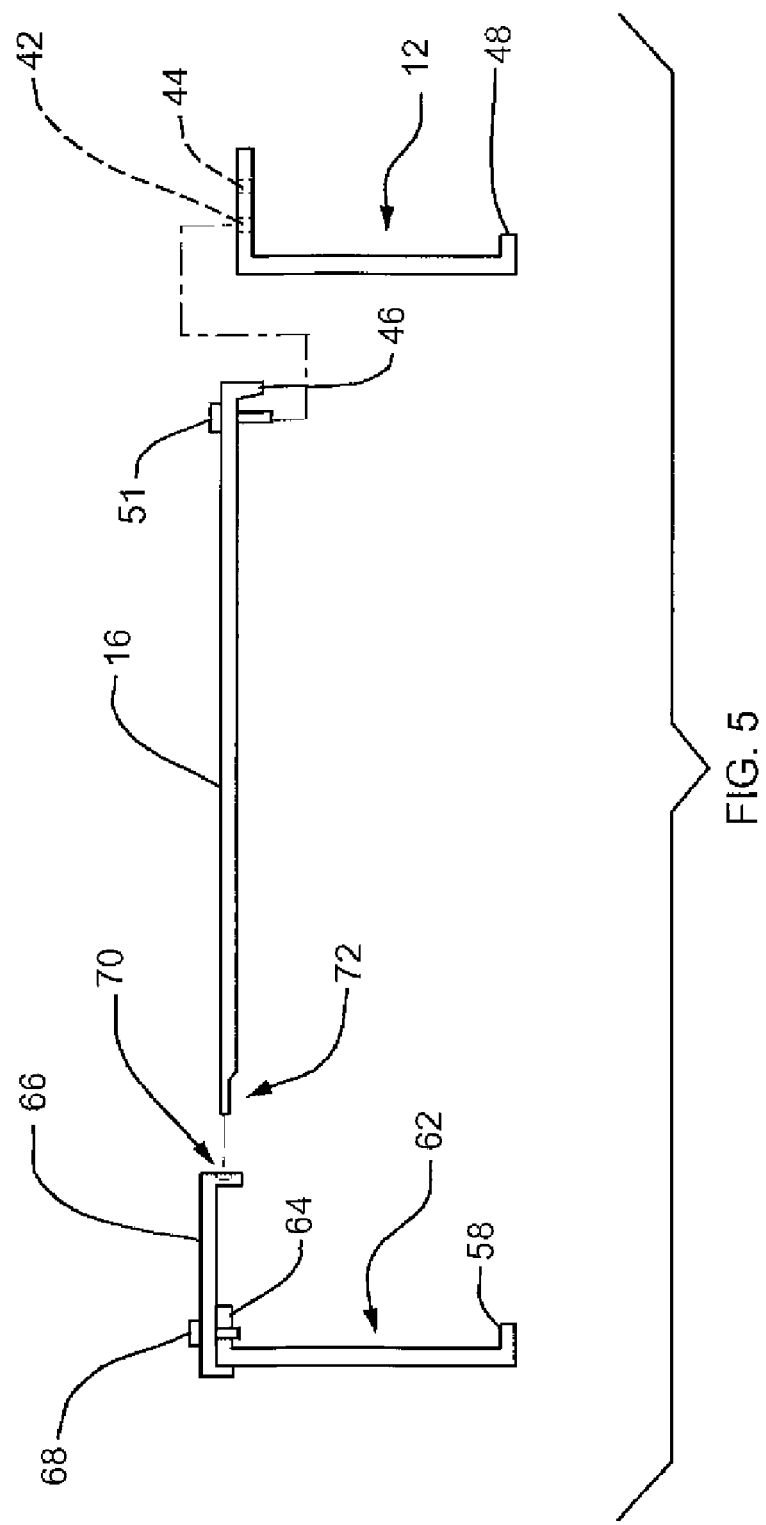

CABLE MANAGEMENT DEVICE

TECHNICAL FIELD

The present invention relates to organizers and more particularly, relates to cable organizers for use with network switches.

BACKGROUND INFORMATION

Many electrical components are grouped together and stored in racks or the like. These electrical components, for example network switches and the like, typically include a multitude of cables and wires. For example, a typical network rack of Cisco 6509® switches includes 288 cables for just the networking features alone.

Network equipment requires proper cable management in order to utilize the hot swappable features and prevent the multitude of cables from becoming an unmanageable mess. For example, without proper cable management, the removal and replacement of a single damaged or broken network switch may impact the entire network since cables to a plurality of network switches may have to be removed in order to gain access to the broken network switch. Not only is this labor intensive and thus expensive, but it is also highly disruptive to the overall network.

While cable management systems currently exist, the know systems suffer from several problems. Many of the known cable management systems are not retrofittable to existing racks. Not only does this require the purchase of expensive racks, but it also requires significant network downtime since all of the network switches need to be removed from their existing rack and reinstalled in the new rack.

Additionally, while the known cable management systems generally organize the cables, they do not organize the cables such that only cables associated with a specific piece of equipment are grouped together. For example, the known cable management systems allow cables to adjacent pieces of equipment to be grouped together. As a result, if a specific piece of equipment needs to be removed, one or more adjacent pieces of equipment often also have to be removed, thus negatively affecting the overall network and increasing labor/maintenance costs.

Moreover, the known cable management systems do not prevent cables from being run over fan cards of the like. In a typical installation, one or more fan cards are typically disposed along an outer edge of the rack. For example, in a typical rack of Cisco 6509 switches, the fan card is typically disposed along a left side or edge of the rack. These fan cards often need to be replaced. However, the known cable management systems do not prevent cables from being inadvertently run over the fan card. As a result, the replacement/removal of a fan card often requires cables to be disconnected from one or more network switches, thus negatively affecting the performance of the entire network and further increasing labor/maintenance costs.

Accordingly, what is needed is a cable management system that can be easily and inexpensively retrofitted to an existing rack. The cable management system should also preferably organize the cables such that the removal/replacement of a single piece of equipment does not affect any other piece of equipment. Additionally, the cable management system should also preferably prevent cables from being run over/across specific pieces of equipment such as fan cards or the like.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

SUMMARY

According to one embodiment, the present invention features a cable management system for use with a rack having four sides, a plurality cables, and at least one fan card disposed proximate a second side of the rack. The cable management system includes a first support, a second support, and a plurality of cable arms.

The first support is adapted to be disposed along at least a portion of a first side of the rack. The first support includes a base adapted to be secured to the first side of the rack, a plurality of outwardly extending supports, and a plurality of apertures sized and shaped to accept a plurality of cables. Each of the outwardly extending supports includes a mounting area disposed proximate a distal end.

The second support is adapted to be disposed along at least a portion of a second side of the rack proximate the fan card. The second support includes a base adapted to be secured to the second side of the rack, an outwardly extending support having a generally solid surface, and a fan cover having a generally solid surface. The fan cover is removably secured to the outwardly extending support and includes a plurality of mounting areas. In the preferred embodiment, the mounting area includes a plurality of slots, for example generally L shaped slots.

The plurality of cable arms each include a first and a second end adapted to be removably secured to the first and the second supports, respectively. The cable arms are adapted to support a plurality of cables disposed through a single aperture in the first support. The cable arms optionally include a plurality of securing means such as hook and loop fasteners or straps.

According to one embodiment, the cable arms include a generally U shaped cross section, preferably having a plurality of openings disposed along a longitudinal axis of the cable arm sized and shaped to accept at least one cable end. Alternatively, the cable arms includes a longitudinal channel having a plurality of openings disposed along a longitudinal axis of the cable arm sized and shaped to accept at least one cable end.

In one embodiment, each of the first mounting areas of the first support includes a first and a second aperture. The first aperture is adapted to accept a tab disposed proximate each of the first ends of the plurality of cable arms. The second aperture is adapted to threadable engage with the each of the first ends of the plurality of cable arms.

According to another embodiment, the present invention features a cable management system including a rack, a first support, a second support, and a plurality of cable arms.

The rack includes at least a first, a second, and a third side and is adapted to contain a plurality of switches and a fan card disposed proximate the second side. According to one embodiment, the first and second supports are integral components with the rack. Alternatively, the first and second supports are removably connected to the rack.

The first support includes a base adapted to be disposed proximate the first side of the rack. A plurality of outwardly extending arms extend outwardly from the base. A plurality of openings are disposed between the plurality of outwardly extending arms and are sized and shaped to accept a plurality of cables associated with a specific switch.

The second support includes a base adapted to be disposed along at least a portion of the second edge of the rack. An outwardly extending support having a generally solid surface extends from the base and a fan cover is removably secured to the outwardly extending support. The fan cover includes a generally solid surface disposed over at least a portion of the fan card. In the preferred embodiment, the fan cover includes a plurality of slots, for example but not limited to L shaped slots, sized and shaped to removably engage with a first end of plurality of cable arms.

The plurality of cable arms are adapted to be removably secured to the first and the second supports. A plurality of cables disposed through a single aperture in the first support are supported by the cable arms. In the preferred embodiment, the cable arms include a generally C shaped cross section.

According to yet another embodiment, the present invention features a method of organizing a plurality of cables for a plurality of network switches. The method includes the acts of providing a first support having a plurality of openings. The openings are adapted to accept a plurality of cables associated with a only a single network switch. The method also includes providing a second support disposed proximate a fan card. The second support prevents cables from being disposed proximate the fan card. A plurality of cable arms are removably secured to the first and the second supports and the plurality of cables disposed through each of the openings are secured along a longitudinal axis of a cable arm.

In yet a further embodiment, the present invention features a method of organizing a plurality of cables for a plurality of network switches. The method includes the acts of securing a first support along at least a portion of a first side of the rack. The first support includes a plurality of outwardly extending arms and a plurality of openings disposed between the plurality of outwardly extending arms. A plurality of cables are arranged along an outer edge of the first support wherein only cables associates with a first switch are disposed through a first of the plurality of openings. An outwardly extending support is secured along at least a portion of a second side of the rack proximate a fan card. The outwardly extending support has a generally solid surface. A fan cover is mounted to the outwardly extending support such that the fan cover is disposed over at least a portion of the fan card. The fan cover has a generally solid surface. A plurality of cable arms are secured to the first support and the fan cover and the cables associated with the first switch are arranged along a longitudinal axis of the cable arm.

BRIEF DESCRIPTION OF THE DRAWINGS

These and-other features and advantages of the present invention will be better understood by reading the following detailed description, taken together with the drawings wherein:

FIG. 4A is an end view of yet another embodiment of the cable arm according to the present invention;

FIG. 5 is a side view of the cable management system according to the present invention.

DETAILED DESCRIPTION OF THE PREFERRED EMBODIMENTS

Figure 1:
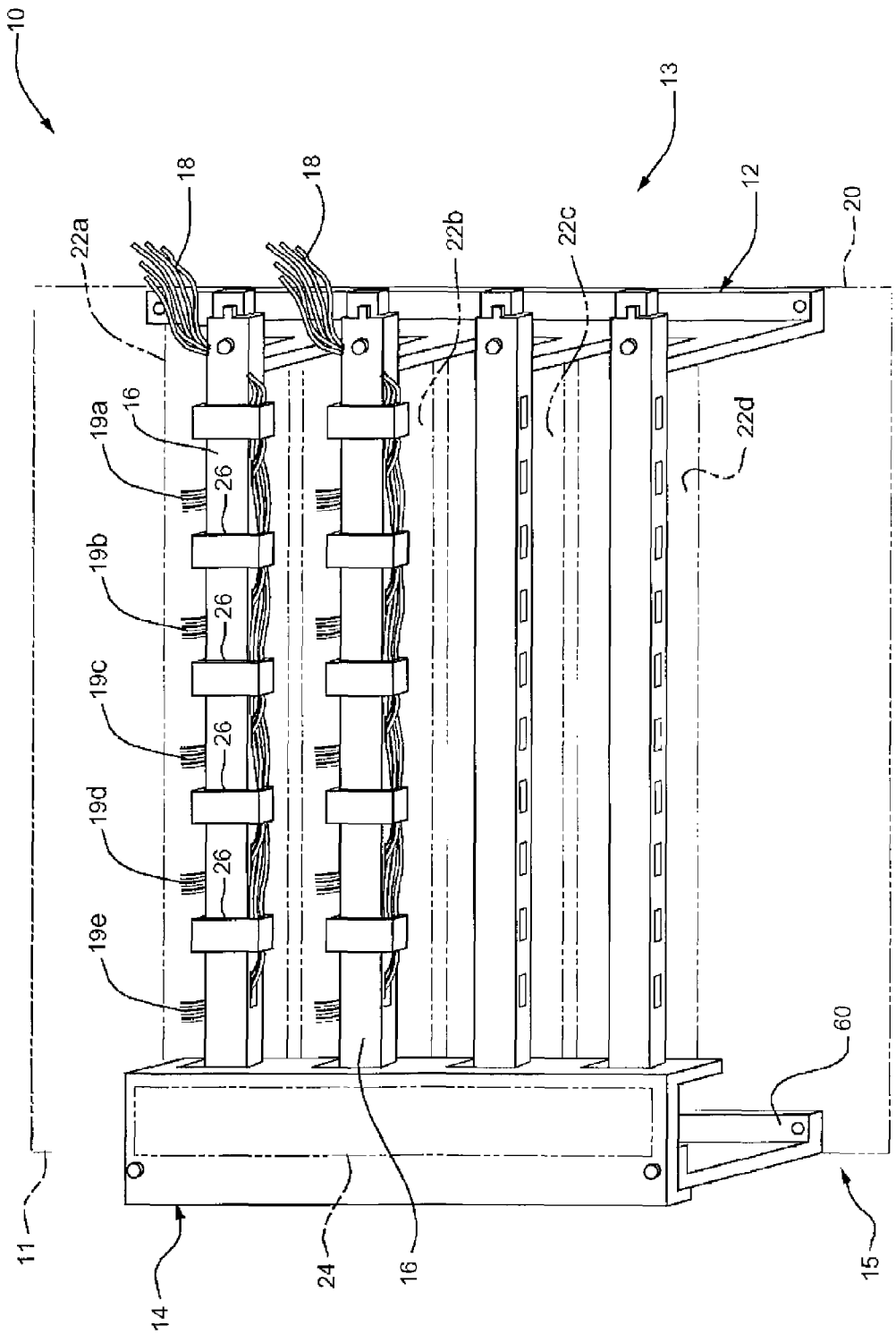
FIG. 1 is a plan view of one embodiment of the cable management system shown in combination with a rack.

A cable management system 10, FIG. 1, is adapted to be mounted or otherwise secured to a rack 11 containing one or more switches 22, such as, but not limited to, a Cisco® 6509 switch. While the present invention will be described with respect to a Cisco® 6509 switch, it is to be understood that this is for illustrative purposes only, and is not a limitation of the present invention. The present invention may also be used with virtually any equipment stored in a rack such as, but not limited to audio/visual equipment, computer components, telephony equipment, and the like. Any modifications necessary to adapt the cable management system 10 for use with different racks and different equipment are within the knowledge of one of ordinary skill in the art.

In a typical network installation, a plurality of switches 22a–d are mounted within a rack 11 and includes at least one fan card 24. Each switch 22 also includes a plurality of cables 18 entering the rack 11 on a first side 13.

As will be explained in greater detail hereinbelow, the cable management system 10 ensures that the plurality of cable 18 enter the rack 11 on the first side 13 of the rack 11. The cable management system 10 also ensures that the ends 19 of the cables 18 are terminated proximate their respective receptacles on the switches 22. Moreover, the cable management system 10 prevents cable 19 from being placed on or about the fan card 24, thus ensuring that the fan card 24 can be easily swapped-out for maintenance. Additionally, the cable management system 10 organizes and manages the cable 19 such that any switch 22 can be easily removed and/or replaced without interfering with any other switch 22.

The cable management system 10 includes a first support 12 disposed about a first side 13 of the rack 11, a second support 14 disposed about a second side 15 of the rack 11, and a plurality of arms 16 removably connected between the first and second supports 12, 14. In the preferred embodiment, the cable management system 10 is removably secured or otherwise mounted to an existing rack 11 such that the cable management system 10 can be easily retrofitted to existing installations without having to replace the rack 11. Alternatively, the cable management system 10 may be integrated into a rack 11.

Figure 2:
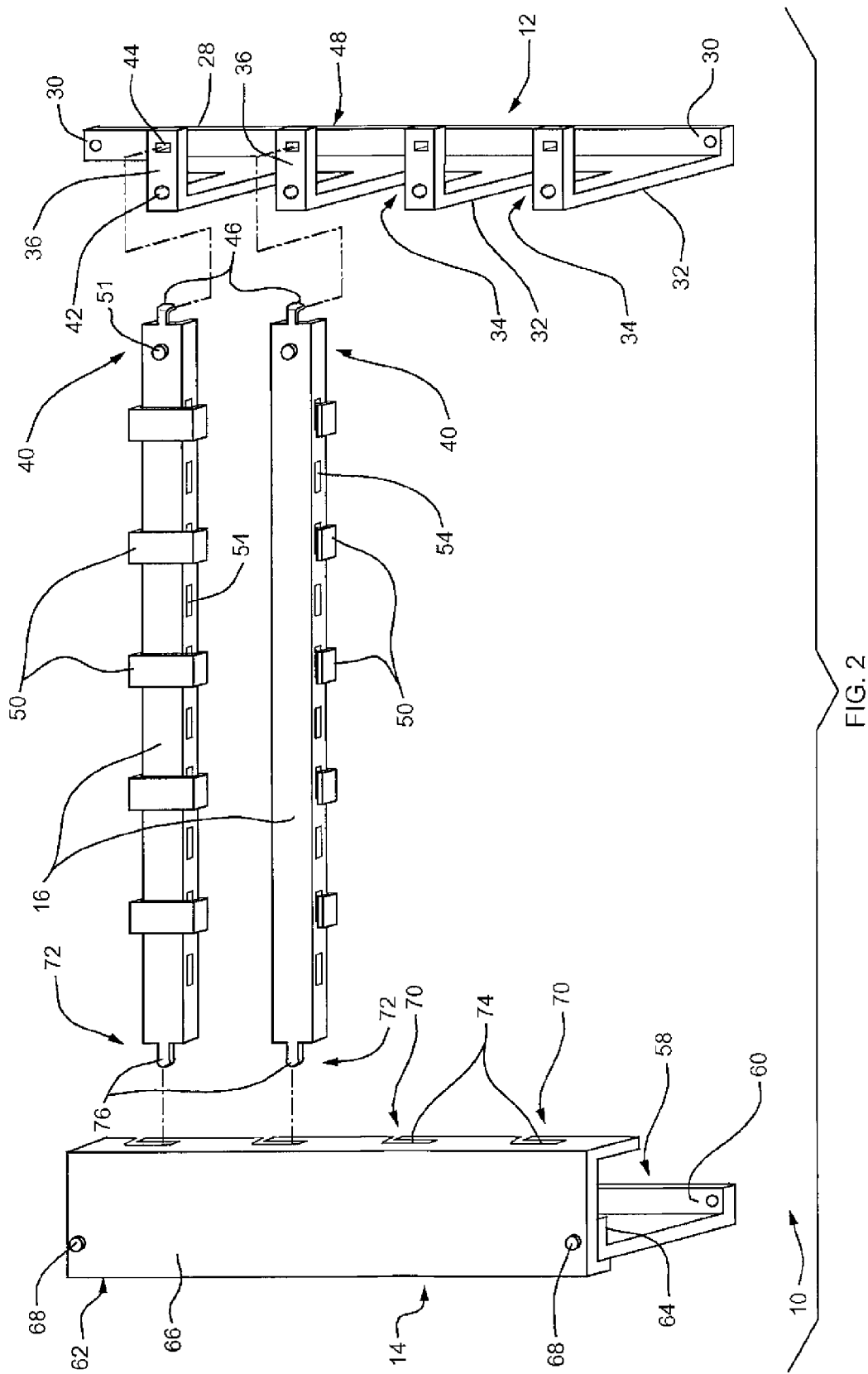
FIG. 2 is a perspective view of another embodiment of the cable management system shown in FIG. 1 according to the present invention.

Referring specifically to FIG. 2, the first side 12 of the cable management system 10 includes a base 28 adapted to be secured to the first side or edge 13 of the rack 11. In the preferred embodiment, the base 28 is secured to the rack 11, preferably using two or more mounts 30 (e.g., one at each end) secured with bolts, screws, clamps, adhesive or the like. The base 28 may be either permanently secured to the rack 11, or alternatively may be removably secured to the rack 11 using bolt, screws, clamps, or the like. Optionally, the base 28 may be molded or otherwise integrated into the rack 11 such that the base 28 is part of the rack 11.

The first side 12 includes a plurality of supports 32 extending generally outwardly and away from the rack 11. The plurality of supports 32 are spaced apart from each other and include a plurality of apertures 34 sized and shaped to accept the plurality of cables 19 for each switch 22. The distal end of each of the plurality of supports 32 preferably includes a mounting area 36. The mounting area 36 includes any device for removably connecting a first end region 40 of each of the cable arm 16 to the mounting area 36 of the plurality of supports 32 such as, but not limited to, a clamp, nut/bolt, screw, pin, clasp, slot, channel, or the like. In the exemplary embodiment, the mounting area 36 includes a first threaded opening 42 for receiving a bolt/screw or the like 51 disposed proximate the first end region 40 of the cable arm 16 and an aperture 44 for receiving a tab 46 disposed proximate the first end region 40 of the cable arm 16. Other mounting devices/methods either known or hereinafter discovered are also within the scope of the present embodiments unless specifically otherwise limited by the claims.

As discussed above, the plurality of cables 18 are arranged within the apertures 34 disposed between the plurality of supports 32 such that only the cables 18 for a specific switch 22 enter any one specific aperture 34. The remaining cables 18 are run along the outside edge 48 of the first support 12. This arrangement ensures that cables 18 from a first switch 22 do not become mixed/entangled with an adjacent switch 22.

The cables 18 for a specific switch 22 enter the aperture corresponding that the specific switch 22 and are then run along the corresponding cable arm 16. Cable arm 16 includes a first end region 40 as discussed above for removably securing the cable arm 16 to the first support 12. The means for removably securing the cable arm 16 to the first support 12 is dependent upon the type of mounting area 36 used, and is within the knowledge of one skill in the art.

The cable arm 16 is adapted to include one or more securing means 50 disposed along the longitudinal axis of the cable 16. The securing means 50 securing the cable 18 to the cable arm 16 and allow the cable ends 19 to be terminated at along the longitudinal axis of the cable arm 16 at the proper location. In the preferred embodiment, the securing means 50 include hook and loop type fasteners, though any faster or securing means known to those skilled in the art such as, but not limited to, zip ties, clips, wire ties, or the like can also be used.

Because the cables 18 are secured to the cable arm 16, a particular switch 22 can be easily and quickly replaced without having to sort-through or organize a multitude of cables. To replace a particular switch 22, the user simply disconnects the cable ends 19 associated with the particular switch 22 and removes a single cable arm 16 associated with the particular switch 22 from the first and/or second support 12, 14. This greatly reduces maintenance costs and greatly reduces simplifies the process.

Figure 3A:
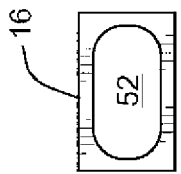
FIG. 3A is an end view of one embodiment of the cable arm according to the present invention.
Figure 4B:
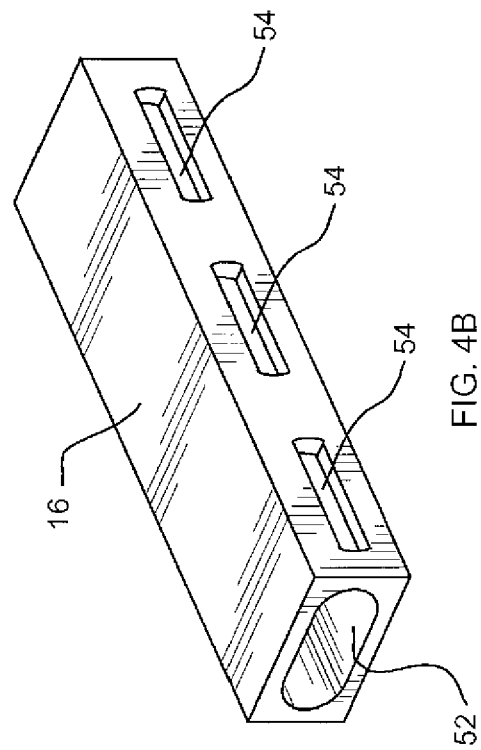
FIG. 4B is a perspective view of the cable arm shown in FIG. 4A according to the present invention.
Figure 3A:
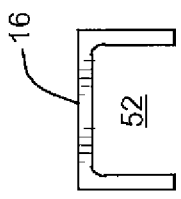
Figure 3B:
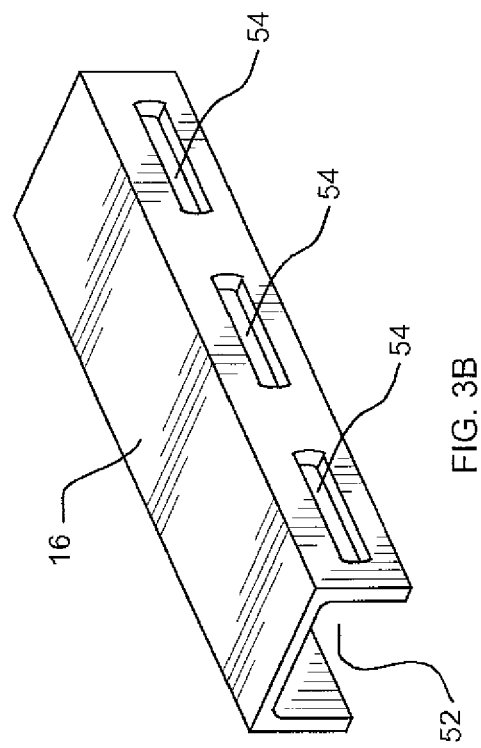
FIG. 3B is a perspective view of the cable arm shown in FIG. 3A according to the present invention.

In the preferred embodiment, the cable arm 16 includes a plurality of slots 52 or the like disposed along at least one side. The securing means 50 is preferably disposed at least partially through the slot 52. Additionally, the cable arm 16 may also include a U or C shape cross section, FIG. 3, or a longitudinal opening, FIG. 4 forming a channel or slot 52 sized and shaped to accept the cables 18. The longitudinal axis of the cable arm 16 also includes a plurality of openings 54 sized and shaped to allow the cable end 19 to fit through to be terminated at the switch 22. This embodiment does not need the securing means 50.

The second support 14, FIGS. 1 and 2, of the cable management system 10 includes a base 58 adapted to be secured to a second side or edge 15 of the rack 11 and a fan cover 66 in a manner similar to that described above with respect to the first support 12. In the preferred embodiment, the base 58 is secured to the rack 11, preferably using two or more mounts 60 (e.g., one at each end) and bolts/screws. The base 58 may be either permanently secured to the rack 11, or alternatively may be removably secured to the rack 11 using bolt, screws, clamps, adhesive, or the like. Optionally, the base 58 may be molded or otherwise integrated into the rack 11 as described above.

The base 58 includes an upright region 62, FIGS. 2 and 5, extending outwardly from the rack 11. The upright region preferably includes a generally solid, generally surface. As will be discussed in more detail, the upright region prevents cables 18 from entering along the second side 15 of the rack 11. This is highly desirably because the fan card 24 is disposed proximate the second side 15 of the rack 11. If cables 18 are allowed to be run across the fan card 24, removing the fan card 24 becomes much more difficult and time consuming.

A distal end of the upright region 62 includes a mounting area 64. The mounting area 64 removably secures the fan cover 66 to the base 58. The mounting area 64 includes any device known to those skilled in the art for removably securing the fan cover 66 to the upright region 62 such as, but not limited to, a screw/bolt, clamp, clap, pin, slot or the like 68.

Similar to the upright region 62, fan cover 66 preferably includes a generally solid surface that prevents cables from entering and being run over the fan card 24. The fan cover 66 also includes a plurality of mounting regions 70. The mounting regions 70 are adapted to removably secure the second end 72 of the cable arm 16 in any manner known to those skilled in the art. In the preferred embodiment, mounting area 70 includes a plurality of slots or channels 74, for but not limited to L shaped slots, sized and shaped to accept the second end 72 of the cable arm 16. The second end 72 of the cable arm preferably includes a tab or the like 76 sized and shaped to fit within the slot 74.

Once the cable management system 10 is installed on a rack 11, a particular switch 22 can be easily removed by simply disconnecting the cable ends 19 associated with that particular switch 22. Next, either the first or second end 40, 72 of the cable arm 16 is disconnected from the first or second support 12, 14, and the cable arm 16 is removed from the first and second supports 12, 14. Because the cables 18 are secured to the cable arm 16, the cables 18 are neatly held in place. Additionally, because only the cables 18 associated with the particular switch 22 being replaced are secured to the cable arm 16 being removed and the cables 18 not associated with the switch 22 being replaced are run along the outside 48 edge of the first support 12, no other cables 18 need to be moved or are in the way.

A fan card 24 can be easily removed by simply removing the fan cover 66 from the upright support 62 and removing the fan card 24. Because the upright support 62 and the fan cover are generally solid, no cables can enter the rack 11 or can be run over the fan card 24.

Accordingly, the cable management system 10 according to the present invention allows for a plurality of cables 18 for a plurality of switches 22 to be neatly organized. The cable management system 10 also prevents cables from being run across the fan card 24, thereby facilitating the hot swapping and removable of a fan card without having to remove any cables 18 to a switch 22.

As mentioned above, the present invention is not intended to be limited to a system or method which must satisfy one or more of any stated or implied object or feature of the invention and should not be limited to the preferred, exemplary, or primary embodiment(s) described herein. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the claims when interpreted in accordance with breadth to which they are fairly, legally and equitably entitled.

The invention claimed is:

1. A cable management system for use with a rack having at least first and second sides, a plurality cables coupled to one or more pieces of electronic equipment mounted in said rack, and at least one fan card disposed proximate a second side, said cable management system comprising:
    a first support adapted to be disposed along at least a portion of a first side of said rack, said first support including a base adapted to be secured to said first side of said rack, a plurality of outwardly extending supports, and a plurality of apertures sized and shaped to accept a plurality of cables, wherein each of said outwardly extending supports includes a mounting area disposed proximate a distal end;
    a second support adapted to be disposed along at least a portion of a second side of said rack proximate said fan card, said second support including a base adapted to be secured to said second side of said rack, an outwardly extending support having a generally solid surface, and a fan cover having a generally solid surface, wherein said fan cover is removably secured to said outwardly extending support and includes a plurality of mounting areas; and
    a plurality of cable arms having a first and a second end adapted to be removably secured to said first and said second supports, respectively, each of said plurality of cable arms adapted to support a plurality of cables disposed through a single aperture in said first support.

2. The cable management system as claimed in claim 1 wherein each of said first mounting areas of said first support includes a first aperture adapted to accept a tab disposed proximate each of said first ends of said plurality of cable arms and a second aperture adapted to threadabley engage with said each of said first ends of said plurality of cable arms.

3. The cable management system as claimed in claim 1 wherein each of said plurality of cable arms includes a plurality of securing means.

4. The cable management system as claimed in claim 3 wherein said securing means includes a strap.

5. The cable management system as claimed in claim 3 wherein said securing means includes hook and loop fastener.

6. The cable management system as claimed in claim 1 wherein each of said plurality of cable arms includes a generally U shaped cross section.

7. The cable management system as claimed in claim 6 wherein each of said plurality of cable arms includes a plurality of openings disposed along a longitudinal axis of said cable arm sized and shaped to accept at least one cable end.

8. The cable management system as claimed in claim 1 wherein each of said plurality of cable arms includes a longitudinal channel.

9. The cable management system as claimed in claim 8 wherein each of said plurality of cable arms includes a plurality of openings disposed along a longitudinal axis of said cable arm sized and shaped to accept at least one cable end.

10. The cable management system as claimed in claim 1 wherein said plurality of mounting areas of said fan cover include a plurality of slots.

11. A cable management system comprising:
    a rack having at least a first and a second side, said rack adapted to contain a plurality of switches, a plurality of cables coupled to said plurality of switches, and a fan card disposed proximate said second side;
    a first support including a base adapted to be disposed proximate said first side of said rack, a plurality of outwardly extending arms, and a plurality of openings disposed between said plurality of outwardly extending arms, said plurality of openings sized and shaped to accept a plurality of cables associated with a specific switch;
    a second support including a base adapted to be disposed along at least a portion of said second side of said rack, an outwardly extending support having a generally solid surface, and a fan cover removably secured to said outwardly extending support having a generally solid surface disposed over at least a portion of said fan card; and
    a plurality of cable arms adapted to be removably secured to said first and said second supports, each said plurality of cable arms adapted to support a plurality of said plurality of cables disposed through a single aperture in said first support.

12. The cable management system as claimed in claim 11 wherein said first and said second supports are integral with said rack.

13. The cable management system as claimed in claim 11 wherein said first and said second supports are removably secured to said rack.

14. The cable management system as claimed in claim 11 wherein said fan cover includes a plurality of channels sized and shaped to removably engage with a first end of plurality of cable arms.

15. The cable management system as claimed in claim 11 wherein said cable arms include a generally C shaped cross section.

16. The cable management system as claimed in claim 11 wherein each of said plurality of cable arms includes a plurality of securing means.

17. The cable management system as claimed in claim 16 wherein said securing means includes a strap.

18. The cable management system as 17 wherein said strap includes a hook and loop fastener.

* * * * *